United States Patent [19]

Miyawaki et al.

[11] Patent Number: 5,034,831
[45] Date of Patent: Jul. 23, 1991

[54] MAGNETIC RECORDING AND REPRODUCING APPARATUS HAVING CASSETTE DISCRIMINATING MEANS

[75] Inventors: Chikanori Miyawaki, Neyagawa; Akihiko Yamamura, Toyonaka; Hideki Sakumoto, Katano, all of Japan

[73] Assignee: Samsung Electronics Co., Ltd., Seoul, Rep. of Korea

[21] Appl. No.: 354,224

[22] Filed: May 19, 1989

[30] Foreign Application Priority Data

May 20, 1988 [JP] Japan .................................. 63-124745
May 20, 1988 [JP] Japan .................................. 63-124746

[51] Int. Cl.$^5$ ............................................. G11B 15/32
[52] U.S. Cl. ........................................................ 360/94
[58] Field of Search ............................................ 360/94

[56] References Cited

U.S. PATENT DOCUMENTS 4,005,488 1/1977 Asai et al. .............................. 360/94
4,580,183 4/1986 Maeda et al. .......................... 360/94
4,602,300 7/1986 Ogata et al. ...................... 360/94 X
4,622,605 11/1986 Tsuruoka et al. ..................... 360/94

FOREIGN PATENT DOCUMENTS 3138713   4/1982  Fed. Rep. of Germany .
55-174768 12/1980 Japan .
62-279546 12/1987 Japan .
62-279547 12/1987 Japan .
62-279548 12/1987 Japan .
62-279549 12/1987 Japan .
62-279549 12/1987 Japan .
62-279550 12/1987 Japan .
62-279550 12/1987 Japan .
62-279554 12/1987 Japan .
63-71964   4/1988  Japan .
63-108546  5/1988  Japan .

Primary Examiner—John H. Wolff
Attorney, Agent, or Firm—Cushman, Darby & Cushman

[57] ABSTRACT

A magnetic recording and reproducing apparatus including a cassette discriminating device for discriminating a large cassette having first supply and take-up reels and a small cassette having second supply and take-up reels, a first reel base engageable with the first and second supply reels, a second reel base engageable with the first take-up reel, a third reel base engageable with the second take-up reel, which is lifted and lowered vertically, a first cassette loading device for loading the large cassette onto the first and second reel bases so as to hold the third reel base at a lowered position before completion of loading of the large cassette, a second cassette loading device for loading the small cassette onto the first and third reel bases so as to hold the third reel base at a lifted position before completion of loading of the small cassette and a rotational power transmission device for transmitting a rotational force to the third reel base when the third reel base is held at the lifted position.

9 Claims, 16 Drawing Sheets

MAGNETIC RECORDING AND REPRODUCING APPARATUS HAVING CASSETTE DISCRIMINATING MEANS

BACKGROUND OF THE INVENTION

The present invention relates to a magnetic recording and reproducing apparatus such as a video tape recorder, etc.

FIGS. 1, 2 and 3 show one example of a known magnetic recording and reproducing apparatus into which a large cassette 48 and a small cassette 25 shown by the two-dot chain lines can be selectively loaded. In the known apparatus, an apparatus housing 1 is provided with a cassette holder 2 for inserting the large cassette 48 or the small cassette 25 thereinto. The cassette holder 2 is coupled with the apparatus housing 1 by a link 3 so as to be displaced upwardly and downwardly such that the cassette inserted into the cassette holder 2 is loaded into a predetermined position in the apparatus housing 1. A first reel base 4 and a second reel base 5 are provided on the apparatus housing 1 so as to be engaged with a supply reel and a take-up reel of the large cassette 48, respectively. Furthermore, a third reel base 6 is disposed between the first and second reel bases 4 and 5 so as to be lifted and lowered vertically. At a lifted position of the third reel base 6, the first and third reel bases 4 and 6 are engageable with a supply reel and a take-up reel of the small cassette 25, respectively.

Meanwhile, as shown in FIGS. 2 and 3, a pair of microswitches 7a and 7b are, respectively, provided at opposite end portions in the cassette holder 2 and in the vicinity of a front edge of a front opening of the cassette holder 2. When the large cassette 48 has been inserted into the cassette holder 2, the large cassette 48 is brought into contact with the microswitches 7a and 7b so as to turn on the microswitches 7a and 7b such that the third reel base 6 is lowered. Hence, when the cassette holder 2 is lowered after the large cassette 48 has been completely inserted into the cassette holder 2, the supply reel and the take-up reel of the large cassette 48 are, respectively, brought into engagement with the first and second reel bases 4 and 5. On the other hand, when the small cassette 25 has been inserted into the cassette holder 2, the small cassette 25 is brought into contact with only the microswitch 7a so as to turn on the microswitch 7a. Therefore, the third reel base 6 is lifted when the third reel base 6 is disposed at a lowered position. On the other hand, if the third reel base 6 is disposed at the lifted position, the third reel base 6 is held at the lifted position. Therefore, when the cassette holder 2 is lowered after the small cassette 25 has been completely inserted into the cassette holder 2, the supply reel and the take-up reel of the small cassette 25 are, respectively, brought into engagement with the first and third reel bases 4 and 6. As described above, the small cassette 25 and the large cassette 48 can be selectively loaded into the known apparatus.

However, the known apparatus of the above described arrangement has a drawback that if the third reel base 6 has not yet been lowered completely during descent of the cassette holder 2 having a large cassette 48 inserted thereinto when the large cassette 48 is loaded into the apparatus housing 1, the large cassette 48 collides with the third reel base 6. Furthermore, the known apparatus has been disadvantageous in that if the small cassette 25 has not yet been lowered completely during descent of the cassette holder 2 having the small cassette 25 inserted thereinto when the small cassette 25 is loaded into the apparatus housing 1, the take-up reel of the small cassette 25 and the third reel base 6 may have a head-on collision so as to apply an axial contact pressure to each other with the result that descent of the small cassette 25 and ascent of the third reel base 6 cannot be performed.

Meanwhile, a rotary drive unit for driving the third reel base 6 has been earlier proposed in Japanese Patent Application No. 279549/1987 by the assignee of the present application. FIGS. 4 and 5 show this prior art rotary drive unit. In FIG. 4, a roller 11 is coupled with a motor (not shown). An idler roller 13 is urged by a spring 17 so as to be brought into pressing contact with the roller 11 and the third reel base 6. A pinatable lever 14 is so provided as to be pivoted about a shaft 15. The idler roller 13 is rotatably mounted on a shaft 16 secured to the rotary lever 14. A solenoid 18 is engaged with the rotary lever 14 by a pin 19.

In the prior art rotary drive unit of the above described arrangement, when the roller 11 is rotated by the motor (not shown), the idler roller 13 is rotated through contact of the idler roller 13 pressing against the roller 11 and the third reel base 6 by a frictional force therebetween. Furthermore, rotation of the idler roller 13 is transmitted to the third reel base 6 by a frictional force therebetween. When the solenoid 18 is energized, the rotary lever 14 is rotated about the shaft 15 in the counterclockwise direction. As a result, the idler roller 13 is spaced away from the roller 11 and the third reel base 6 such that rotation of the roller 11 is not transmitted to the third reel base 6. The above described arrangement can be used for an apparatus employing several kinds of cassettes of different sizes, in which a reel base is lifted and lowered so as to be rotated by an external motor only when the reel base is disposed at a lifted position.

However, in the prior art rotary drive unit, since the idler roller 13 acting as a frictional power transmission mechanism is used as a power transmission means, slip is produced during power transmission, so that power transmission is not performed positively. Moreover, since the frictional force changes according to environmental conditions or time, power transmission is not reliable. Furthermore, since a large contact pressure is required for pressing the idler roller 13 against the roller 11 and the third reel base 6, a large radial force is applied to shafts of the roller 11 and the third reel base 6 and thus, the roller 11 and the third reel base 6 cannot be rotated smoothly. Moreover, since the idler roller 13 is required to be properly pressed against the roller 11 and the third reel base 6, the position and size of the idler roller 13 are restricted. Even if a gear is employed in place of the idler roller 13, a problem arises that proper engagement of gears is not effected due to contact between the tooth edges and thus, it becomes difficult to operate the prior art rotary drive unit positively.

SUMMARY OF THE INVENTION

Accordingly, an essential object of the present invention is to provide a magnetic recording and reproducing apparatus in which descent or ascent of a third reel base for a take-up reel of a small cassette is completed before loading of a large cassette or the small cassette into an apparatus housing such that collision between the third reel base and the large and small cassettes can be prevented.

Another important object of the present invention is to provide a magnetic recording and reproducing apparatus in which a rotary drive unit for driving the third reel base employs gears such that the gears are surely engaged with each other at the time of rotary drive of the third reel base.

In order to accomplish the first object of the present invention, a magnetic recording and reproducing apparatus embodying the present invention comprises: a cassette discriminating means for discriminating between a large cassette and a small cassette having an external size smaller than that of said large cassette; said large cassette incorporating a first supply reel and a first take-up reel spaced a first distance from each other; said small cassette incorporating a second supply reel and a second take-up reel spaced a second distance from each other such that the second distance is smaller than the first distance; a first reel base which is engageable with said first supply reel of said large cassette and said second supply reel of said small cassette; a second reel base which is engageable with said first take-up reel of said large cassette; a third reel base which is disposed between said first reel base and said second reel base so as to be engaged with said second take-up reel of said small cassette and is lifted and lowered between a lifted position and a lowered position vertically relative to an apparatus housing of said magnetic recording and reproducing apparatus; a first cassette loading means for loading said large cassette onto said first reel base and said second reel base such that said third reel base is held at the lowered position before completion of loading of said large cassette; a second cassette loading means for loading said small cassette onto said first reel base and said third reel base such that said third reel base is held at the lifted position before completion of loading of said small cassette; and a rotational power transmission means for transmitting a rotational force to said third reel base when said third reel base is held at the lifted position.

By this arrangement, the third reel base is held, upon completion of displacement of the third reel base, at the lowered position or the lifted position before completion of loading of the cassette. Thus, during loading of the large cassette, such an undesirable phenomenon can be prevented that the large cassette collides with the third reel base in the case where descent of the third reel base has not been completed when the large cassette is being lowered. On the other hand, during loading of the small cassette, such an inconvenience can be obviated that the take-up reel of the small cassette and the third reel base make a head-on collision in the case where ascent of the third reel base has not been completed when the small cassette is being lowered, so that the third reel base can be lifted smoothly.

In order to accomplish the second object of the present invention, a magnetic recording and reproducing apparatus embodying the present invention comprises: a drive gear; a reel base which is engageable with a take-up reel for taking up a magnetic tape accommodated in a cassette and is formed with a first gear; a second gear which is engageable with said drive gear and said first gear so as to be engaged with said drive gear earlier than said first gear; an urging means for urging said second gear to a position where said second gear is engageable with said drive gear and said first gear; a displacement means for displacing said second gear to a position where said second gear is disengaged from said drive gear and said first gear; a detection means for detecting that said cassette has been loaded at a predetermined position; and a rotary means for rotating said drive gear through a necessary amount upon detection of said detection means that said cassette has been loaded at the predetermined position.

By this arrangement, the gears are employed for driving the reel base so as to not only eliminate slip in power transmission but also improve reliability of power transmission. Meanwhile, a large radial force is not applied to the shaft of the reel base and position of the reel base is not restricted. Furthermore, even if tooth edges of the gears are brought into contact with each other, the reel base is rotated by rewinding the tape through a necessary amount immediately after detection of loading of the cassette, so that the first gear of the reel base is surely engaged with the second gear. Furthermore, by rotation of the second gear, the second gear and the drive gear are surely engaged with each other. Alternatively, by rotating the drive gear through the necessary amount, the drive gear is surely engaged with the second gear and the second gear and the first gear can be surely engaged with each other by rotation of the drive gear.

BRIEF DESCRIPTION OF THE DRAWINGS

These objects and features of the present invention will become apparent from the following description of preferred embodiments thereof taken with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
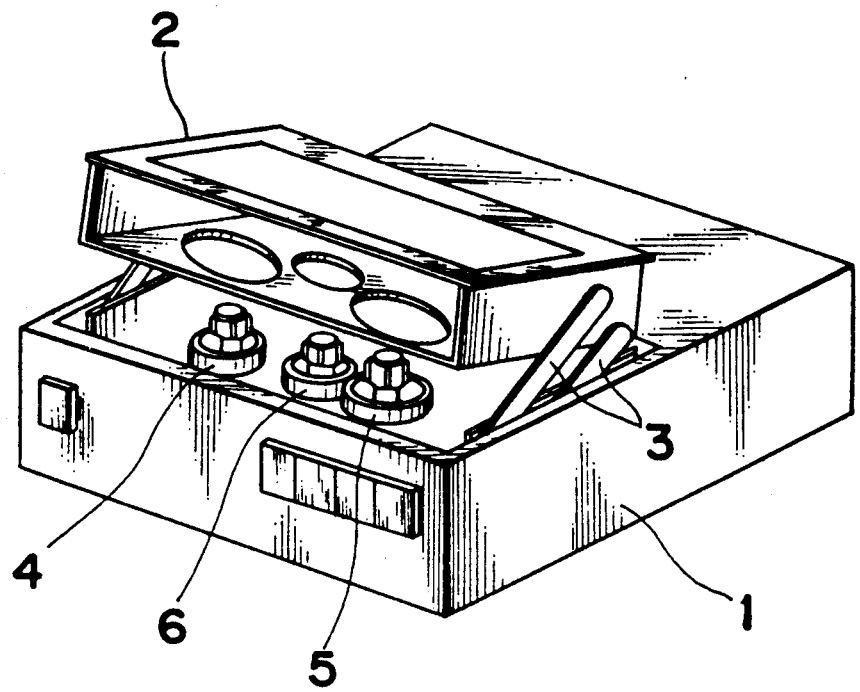
FIG. 1 is a perspective view of a prior art magnetic recording and reproducing apparatus (already referred to)
Figure 2:
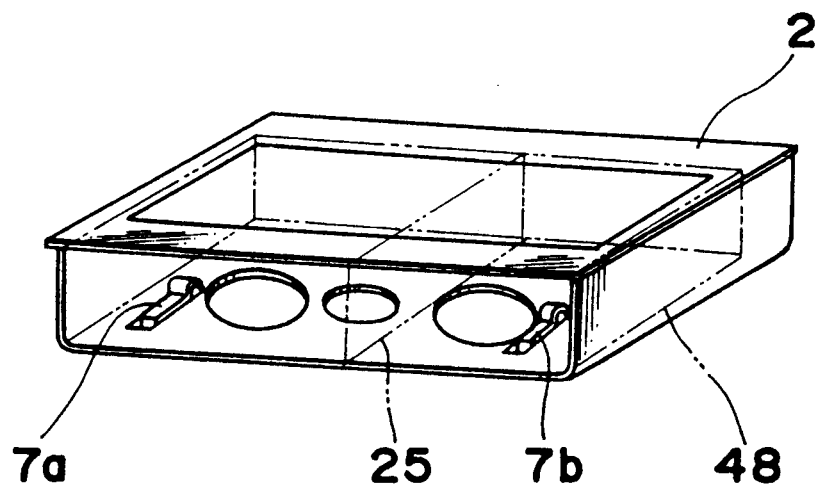
FIG. 2 is a perspective view of a cassette holder employed in the prior art apparatus of FIG. 1 (already referred to)
Figure 3:
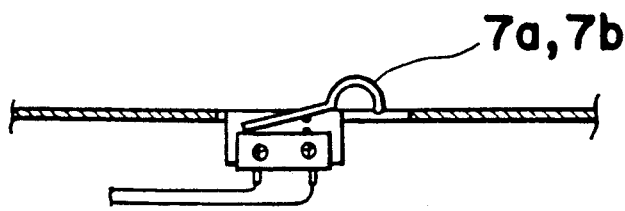
FIG. 3 is a fragmentary sectional view of the cassette holder of FIG. 2 (already referred to)
Figure 4:
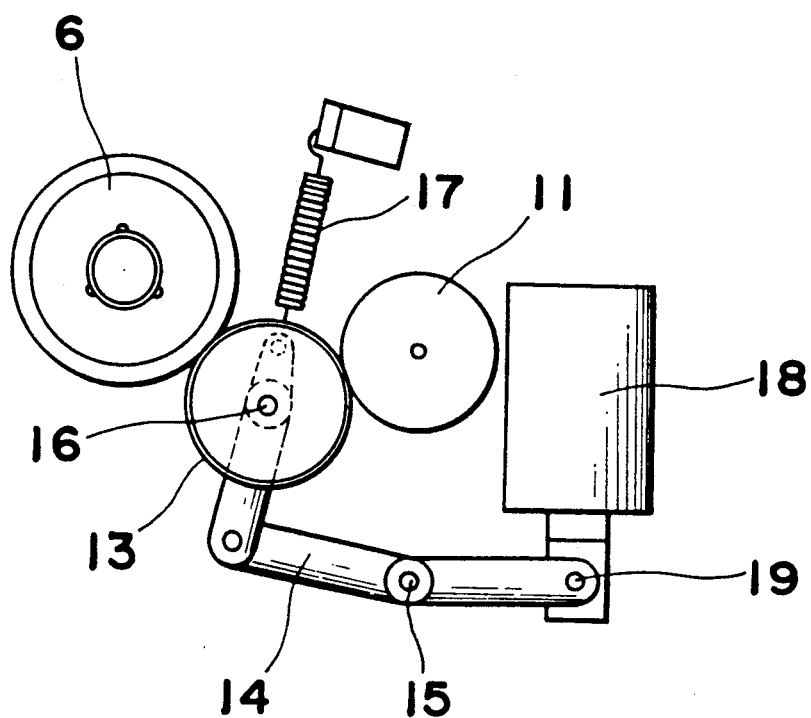
FIG. 4 is a top plan view of a rotary drive unit for rotating a reel base, which is employed in the prior art apparatus of Fig. I (already referred to)
Figure 5:
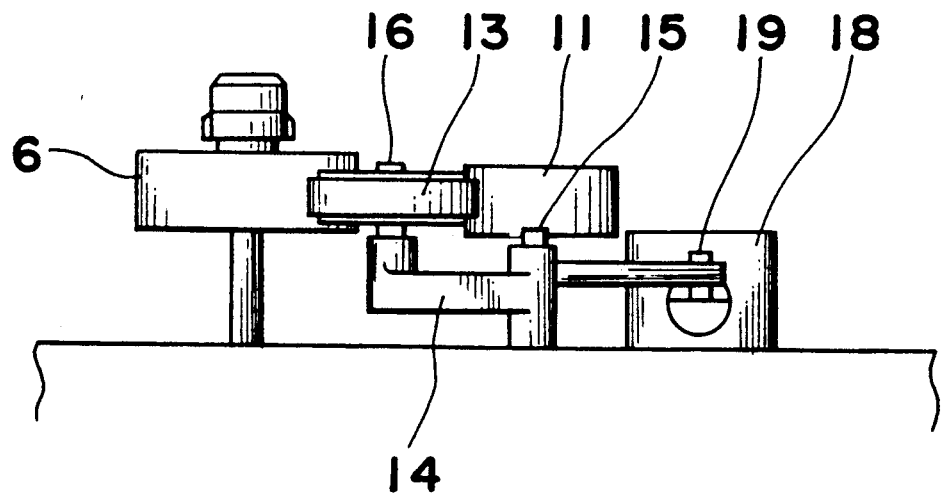
FIG. 5 is a side elevational view of the rotary drive unit of FIG. 4 (already referred to)
Figure 6:
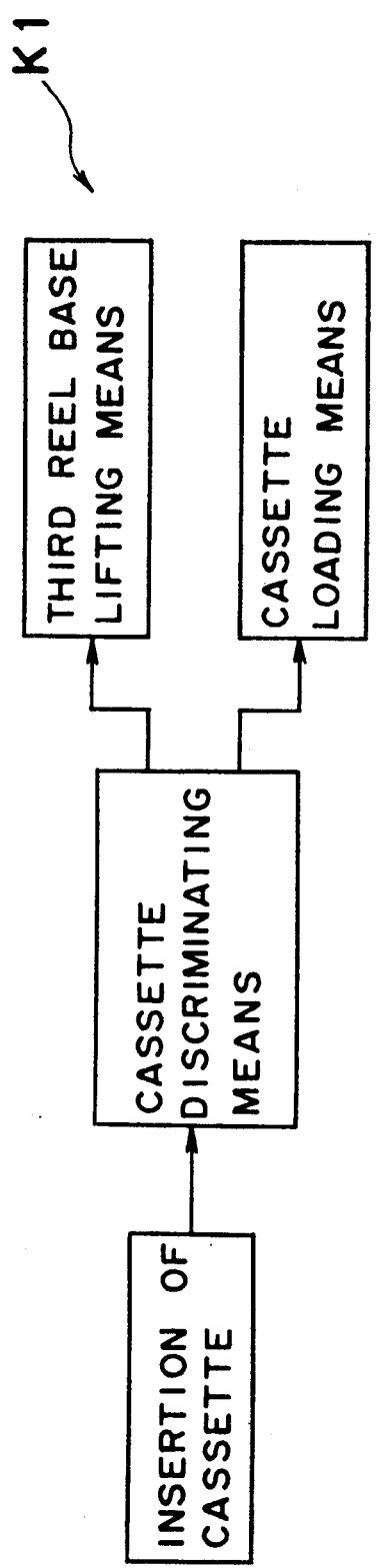
FIG. 6 is a block diagram the showing operational sequence of a magnetic recording and reproducing apparatus according to a first embodiment of the present invention.
Figure 7:
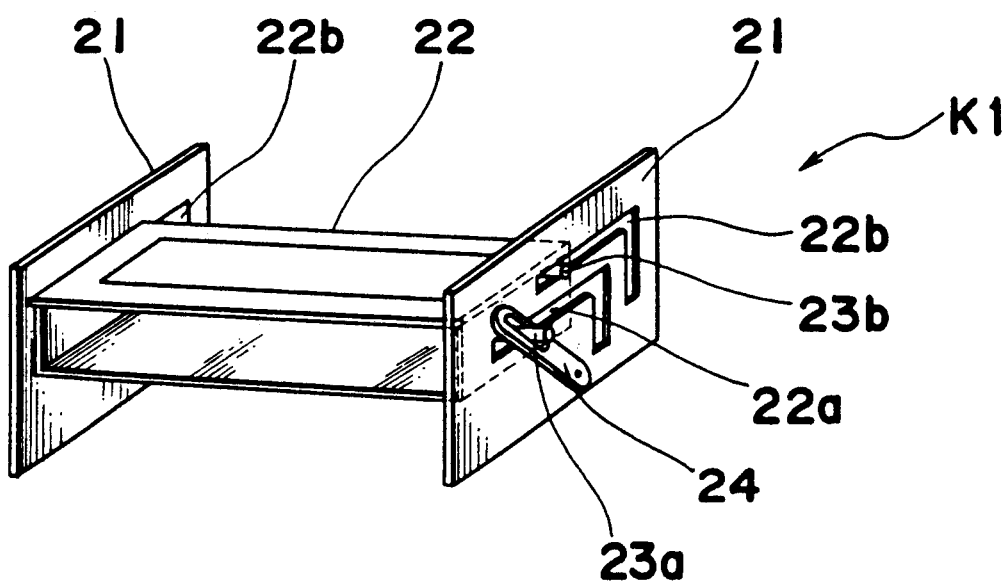
FIG. 7 is a perspective view of a cassette loading mechanism employed in the apparatus of FIG. 6.

Referring now to the drawings, there is shown in FIGS. 6 to 16 and 18, a magnetic recording and reproducing apparatus K1 according to a first embodiment of the present invention. FIG. 6 shows operational sequence of insertion of a cassette, subsequent operation of a cassette discriminating means and the operation of, a third reel base lifting means and a cassette loading means in the apparatus K1, while FIG. 7 shows a cassette loading mechanism employed in the apparatus K1.

In FIG. 7, a pair of side plates 21 are provided so as to hold therebetween a cassette holder 22. Each side plate 21 is formed with L-shaped slots 22a and 22b spaced vertically and horizontally from each other. More specifically, the forward slot 22a is disposed slightly downwardly of the rearward slot 22b. Pins 23a and 23b are mounted on each of opposite side faces of the cassette holder 22 so as to project therefrom. The pin 23a extends through the slot 22a, while the pin 23b extends through the slot 22b. An arm 24 engageable with the pin 23a is provided so that the cassette holder 22 is displaced forwards and rearwards along the slots 22a and 22b by rotation of the arm 24. When the pins 23a and 23b have been displaced to the rear ends of the slots 22a and 22b by rotating the arm 24 in one direction, the cassette holder 22 is lowered so as to be set at a predetermined position in an apparatus housing of the apparatus K1. In order to displace the cassette holder 22 upwardly and forwards, the arm 24 is required to be rotated in the opposite direction. The above described sequential operations are automatically performed by an actuator (not shown) through detection of insertion of the cassette into the cassette holder 22.

Figure 8:
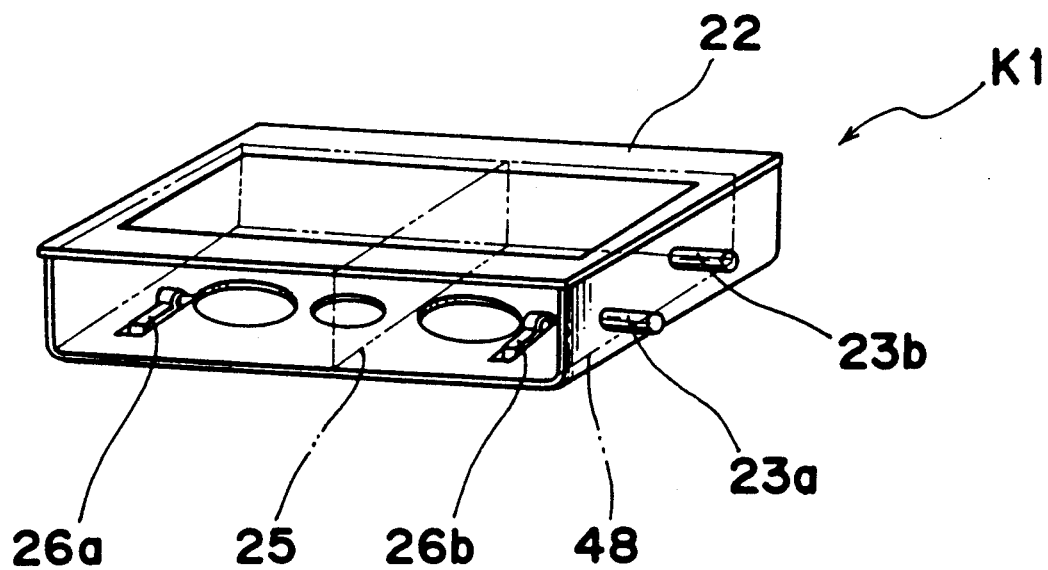
FIG. 8 is a perspective view of a cassette holder of the cassette loading mechanism of FIG. 7.

FIG. 8 shows a state in which a small cassette 25 or a large cassette 48 shown by the two-dot chain lines has been inserted into the cassette holder 22. The small cassette 25 is adapted to be inserted into a left portion of the cassette holder 22 along a guide (not shown) formed on the cassette holder 22. A pair of microswitches 26a and 26b are, respectively, provided at left and right portions of a front opening of the cassette holder 22. When the small cassette 25 is inserted into the cassette holder 22, a lever of only the microswitch 26a is depressed by the small cassette 25 such that the microswitch 26a is turned on. On the other hand, when the large cassette 49 is inserted into the cassette holder 22 so as to fully occupy the front opening of the cassette holder 22, not only the microswitch 26a but also the microswitch 26b is turned on by the large cassette 48. Therefore, the ON state of the microswitches 26a and 26b indicates that the large cassette 48 has been inserted into the cassette holder 22. On the other hand, the ON state of the microswitch 26a and the OFF state of the microswitch 26b indicates that the small cassette 25 has been inserted into the cassette holder 22. Furthermore, the OFF state of the microswitches 26a and 26b indicates that no cassette is inserted into the cassette holder 22. The microswitches 26a and 26b are connected to a system control circuit (not shown) such that the large cassette 48 and the small cassette 25 are automatically discriminated between by the system control circuit.

Figure 9:
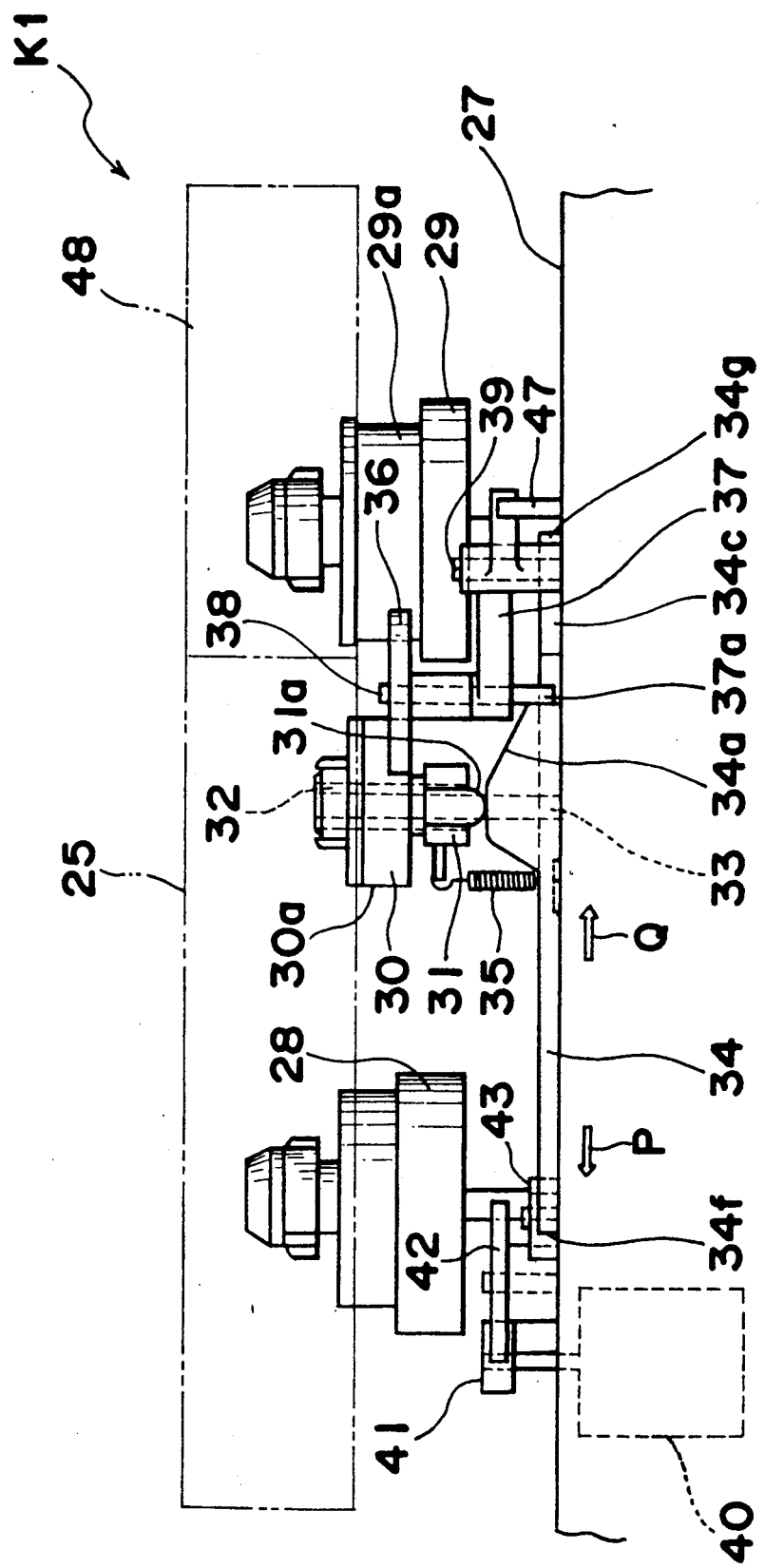
FIG. 9 is a side elevational view showing first, second and third reel bases employed in the apparatus of FIG. 6.
Figure 10:
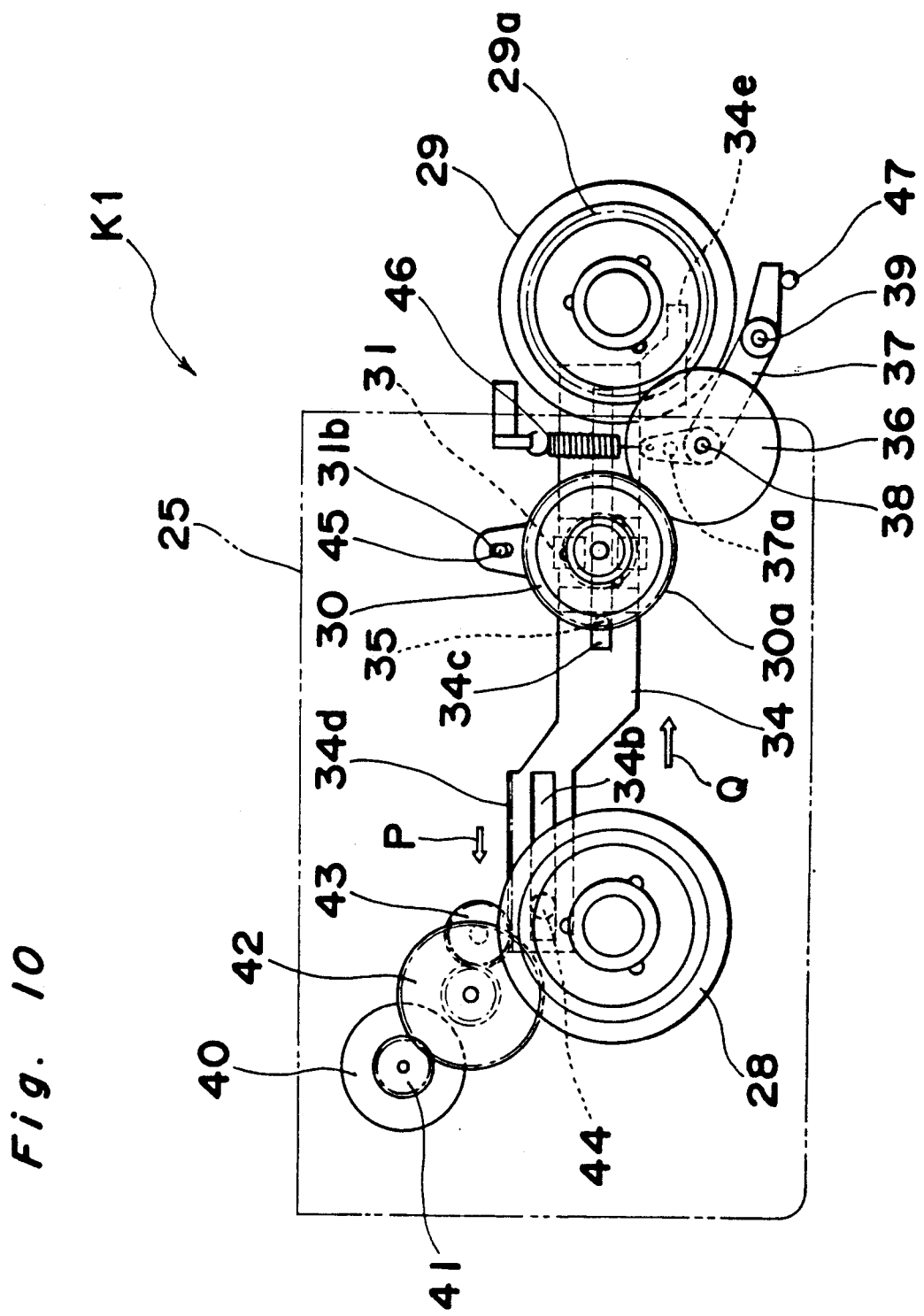
FIG. 10 is a top plan view showing the reel bases of FIG. 9 at the time of loading of a small cassette.
Figure 11:
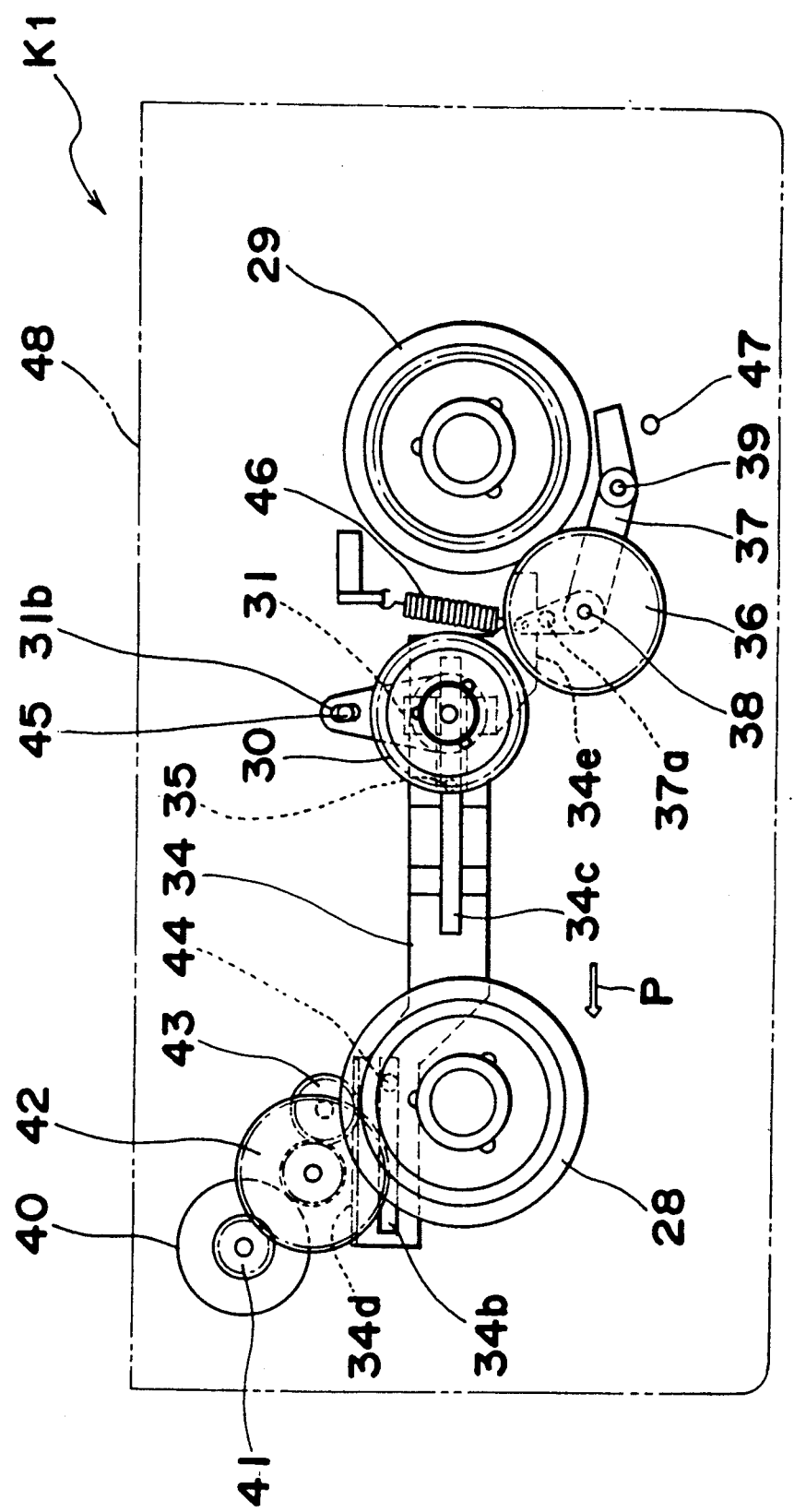
FIG. 11 is a top plan view showing the reel bases of FIG. 9 at the time of loading of a large cassette.

FIGS. 9, 10 and 11 show first, second and third reel bases 28, 29 and 30. FIG. 10 shows a state at the time of loading of a small cassette 25, while FIG. 11 shows a state at the time of loading of a large cassette 48. In FIG. 9, reference numeral 27 denotes a chassis. The first reel base 28 is engageable with a supply reel of a large cassette 48 and a supply reel of the small cassette 25. The second reel base 29 is engageable with a take-up reel of a large cassette 48. The first and second reel bases 28 and 29 are, respectively, driven by motors (not shown). A gear 29a is formed around the a whole periphery of a portion of the second reel base 29. The third reel base 30 is engageable with a take-up reel of a small cassette 25. Therefore, at the time of loading of a large cassette 48, the supply reel and the take-up reel of the large cassette 48 are, respectively, engaged with the first reel base 28 and the second reel base 29. Meanwhile, at the time of loading of a small cassette 25, the supply reel and the take-up reel of the small cassette 25 are, respectively, engaged with the first reel base 28 and the third reel base 30. A gear 30a is formed around the a whole periphery of a portion of the third reel base 30. A hollow shaft 32 extends into a bottom plate 31 of the third reel base 30. The third reel base 30 is rotatably fitted around the hollow shaft 32. A shaft 33 is mounted on the chassis 27 coaxially with the third reel base 30 and brought into sliding engagement with an inner face of the hollow shaft 32. The third reel base 30 can be lifted and lowered between a lifted position and a lowered position vertically relative to the chassis 27.

A slide lever 34 is slidable horizontally on the chassis 27. End cams 34a are, respectively, formed at two portions on the slide lever 34. A lower end of a curved projection 31a formed at each of two portions of the bottom plate 31 of the third reel base 30 is supported by respective end cams 34a. A return spring 35 for urging the bottom plate 31 of the third reel base 30 downwardly at all times is provided so as to hold each projection 31a in contact with the corresponding end cam 34a. An intermediate gear 36 is engageable with the gear 29a of the second reel base 29 and the gear 30a of the third reel base, 30 and is rotatable about a shaft 38 mounted on a pivotable lever 37. A shaft 39 is mounted on the chassis 27 and the pivotable lever 37 is pivotable about the shaft 39. A motor 40 is attached to the chassis 27 and a gear 41 is mounted on an output shaft of the motor 40. Gears 42 and 43 are provided so as to transmit, through reduction of a rotational speed of the motor 40, a rotational force of the motor 40 to the slide lever 34. The gear 30a has a thickness in the axial direction larger than the vertical stroke of the third reel base 30, so as to be engaged with the gear 29a through the intermediate gear 36 at all times regardless of whether the third reel base 30 is disposed at the lifted position or the lowered position.

A shaft 44 is mounted on the chassis 27. Slots 34b and 34c of the slide lever 34 are engaged with the shafts 44 and 33, respectively so as to enable the slide lever 34 to slide in the rightward and leftward directions. A rack 34d is formed on the slide lever 34 so as to be in mesh with the gear 43. A shaft 45 is engaged with an elongated opening 31b formed on the bottom plate 31 of the third reel base 30 so as to prevent rotation of the bottom plate 31. A boss 37a is formed on the rotary lever 37. When the slide lever 34 is displaced leftwards, a cam portion 34e of the slide, lever 34 depresses the boss 37a such that the pivotable lever 37 is rotated counterclockwise about the shaft 39. A spring 46 is provided for urging the lever 37 to rotate clockwise and a stop pin 47 is provided for stopping further clockwise rotation of the lever 37.

Although not specifically shown in the drawings, detection means for detecting left and right distal ends 34f and 34g of the rotary lever 34 is provided such that the lifted position and the lowered position at which the third reel base 30 should be held are detected upon detection by this detection means.

Figure 12:
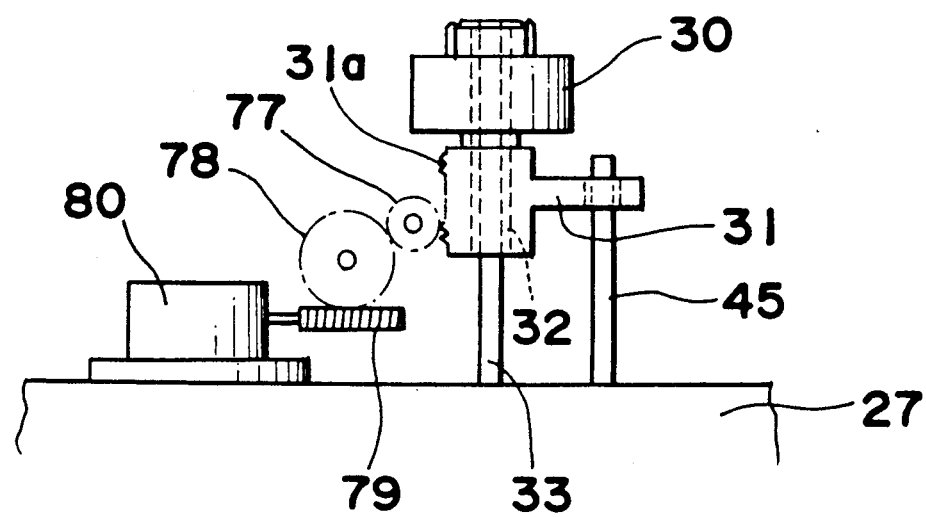
FIGS. 12, 13 and 14a and 14b are views showing arrangements for lifting and lowering the third reel base of FIG. 9, respectively.

Hereinbelow, first, second and third arrangements for lifting and lowering the third reel base 30 are described with reference to FIGS. 12, 13 and 14a and 14b. In FIG. 12 showing the first arrangement for lifting and lowering the third reel base 30, the bottom plate 31 of the third reel base 30 is formed with a rack 31a engageable with a pinion 77. The pinion 77 is also engageable with a worm wheel 78 and a worm 79 engageable with the worm wheel 78 is driven by a motor 80.

Figure 13:
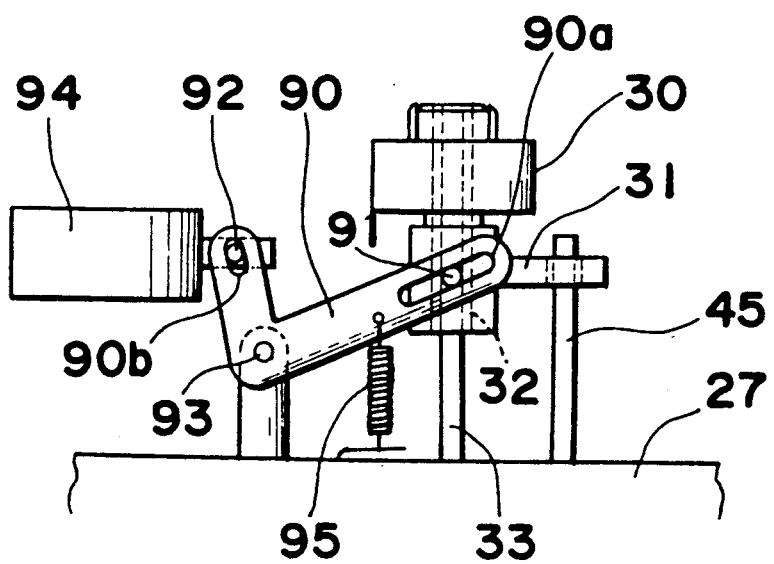

In FIG. 13 showing the second arrangement for lifting and lowering the third reel base 30, the bottom plate 31 is coupled with an electromagnetic solenoid 94 through a substantially L-shaped arm 90. The arm 90 is pivotally mounted so as to be pivoted about a support shaft and is urged clockwise by a tension spring 95 in FIG. 13. Elongated openings 90a and 90b are, respectively, formed at opposite end portions of the arm 90. Pins 91 and 92 are, respectively, mounted on the bottom plate 31 and a shaft of the electromagnetic solenoid 94 and fitted into the elongated openings 90a and 90b, respectively. Therefore, upon energization and deenergization of the electromagnetic solenoid 94, the third reel base 30 is lifted and lowered.

Figure 14A:
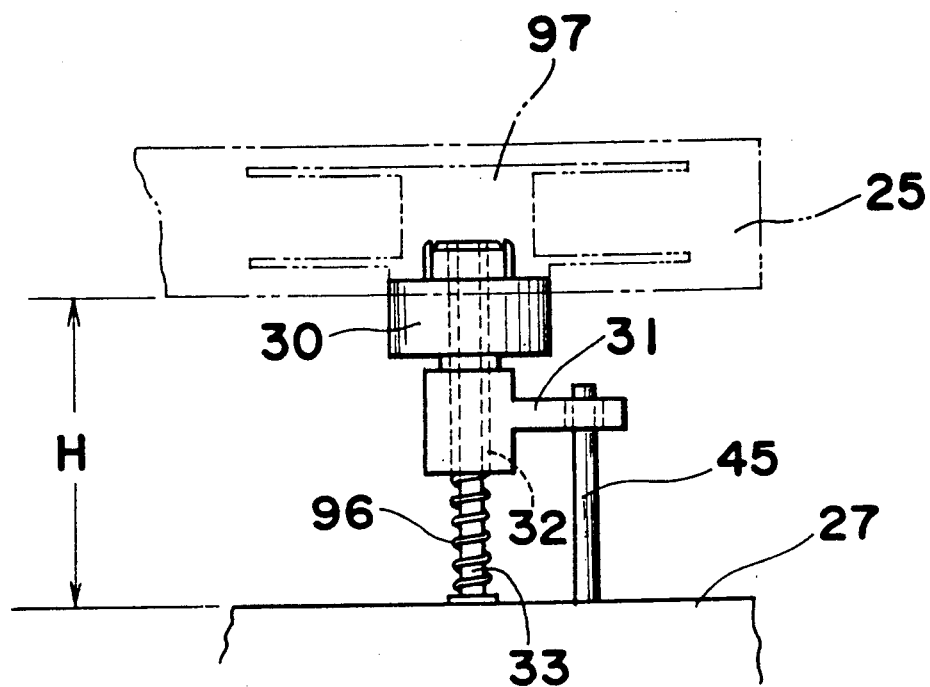
Figure 14B:
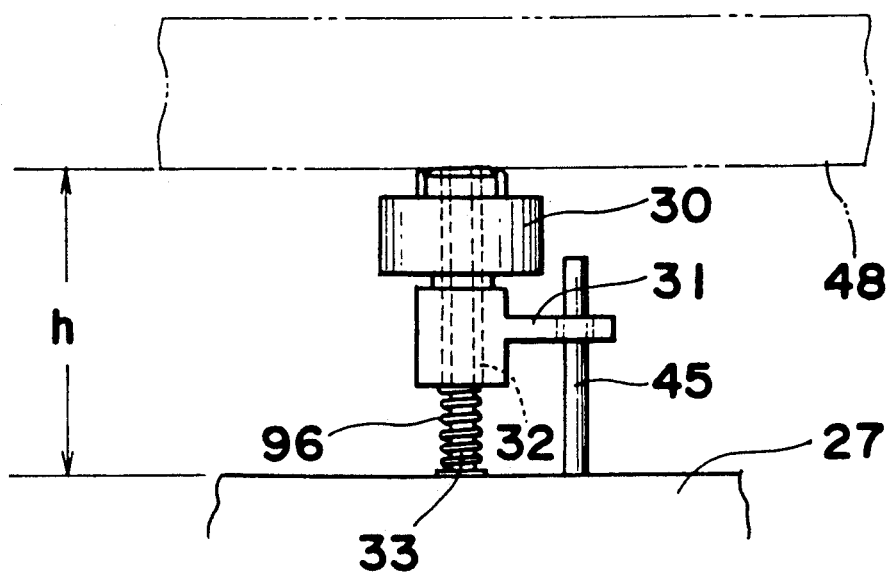

In FIGS. 14a and 14b showing the third arrangement for lifting and lowering the third reel base 30, a compression spring 96 is wound around the shaft 33 and disposed below the bottom plate 31. Thus, the third reel base 30 is urged upwardly by the compression spring 96. Fig. 14a shows a state of loading of the small cassette 25, while FIG. 14b shows a state of loading of the large cassette 48. In FIG. 14a, the take-up reel 97 of the small cassette 25 is engaged with the third reel base 30 and thus, the bottom face of the small cassette 25 is held at a height H from the chassis 27 by the compression spring 96. On the other hand, in FIG. 14b, the third reel base 30 is depressed downwardly by the bottom face of the large cassette 48 against the urging force of the compression spring 96 and thus, the height h of the bottom face of the large cassette 48 from the chassis 27 becomes smaller than the height H of the small cassette 25.

Figure 15:
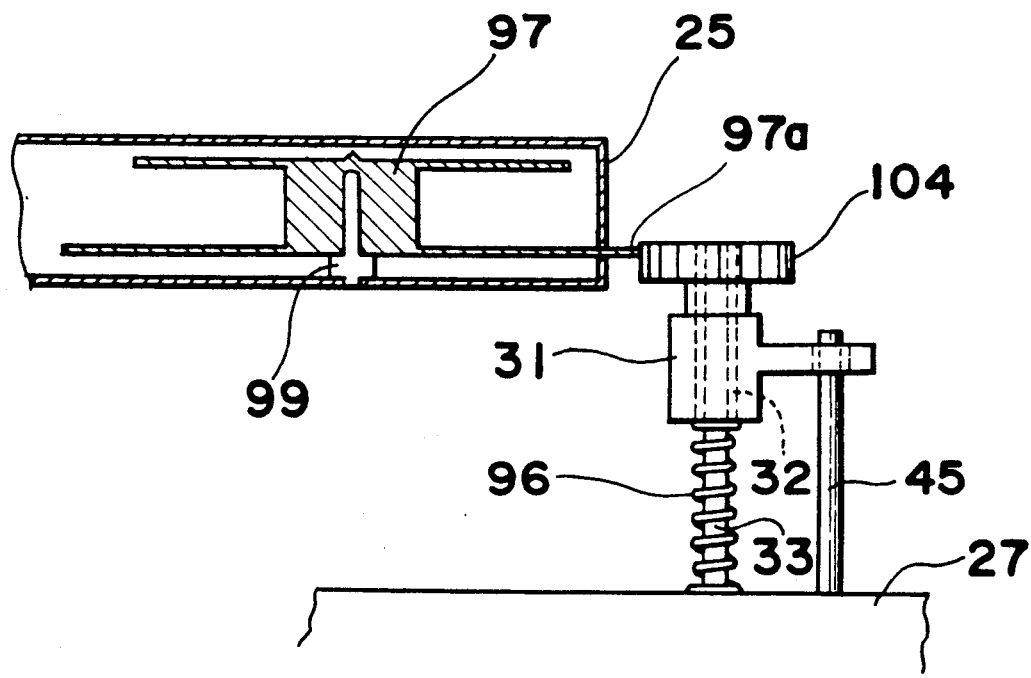
FIG. 15 is a view showing the drive of a take-up reel of the small cassette of FIG. 10.

FIG. 15 shows an arrangement of engagement between the third reel base 30 and the take-up reel 97 of the small cassette 25. In the small cassette 25, the take-up reel 97 is rotatably supported by a shaft 99. A gear 97a is formed around the take-up reel 97. At the lifted position of the third reel base 30, a gear 104 mounted on the shaft 33 is engaged with the gear 97a so as to rotate the take-up reel 97.

Figure 16:
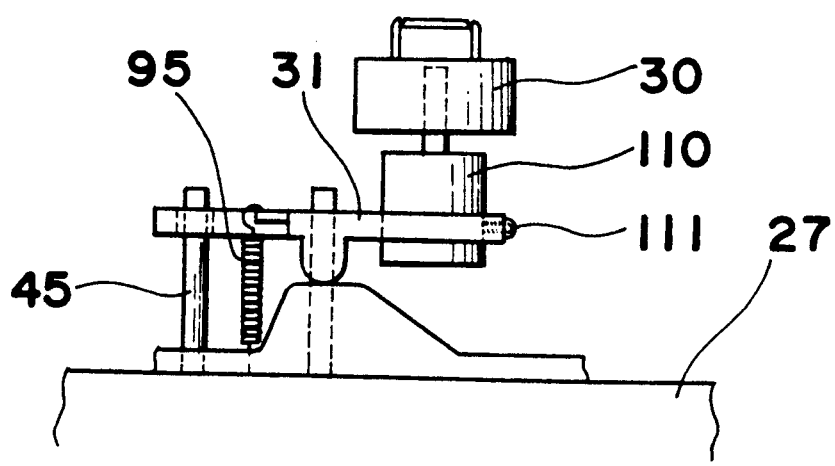
FIG. 16 is a view showing another arrangement for driving the third reel base of FIG. 9.
Figure 18:
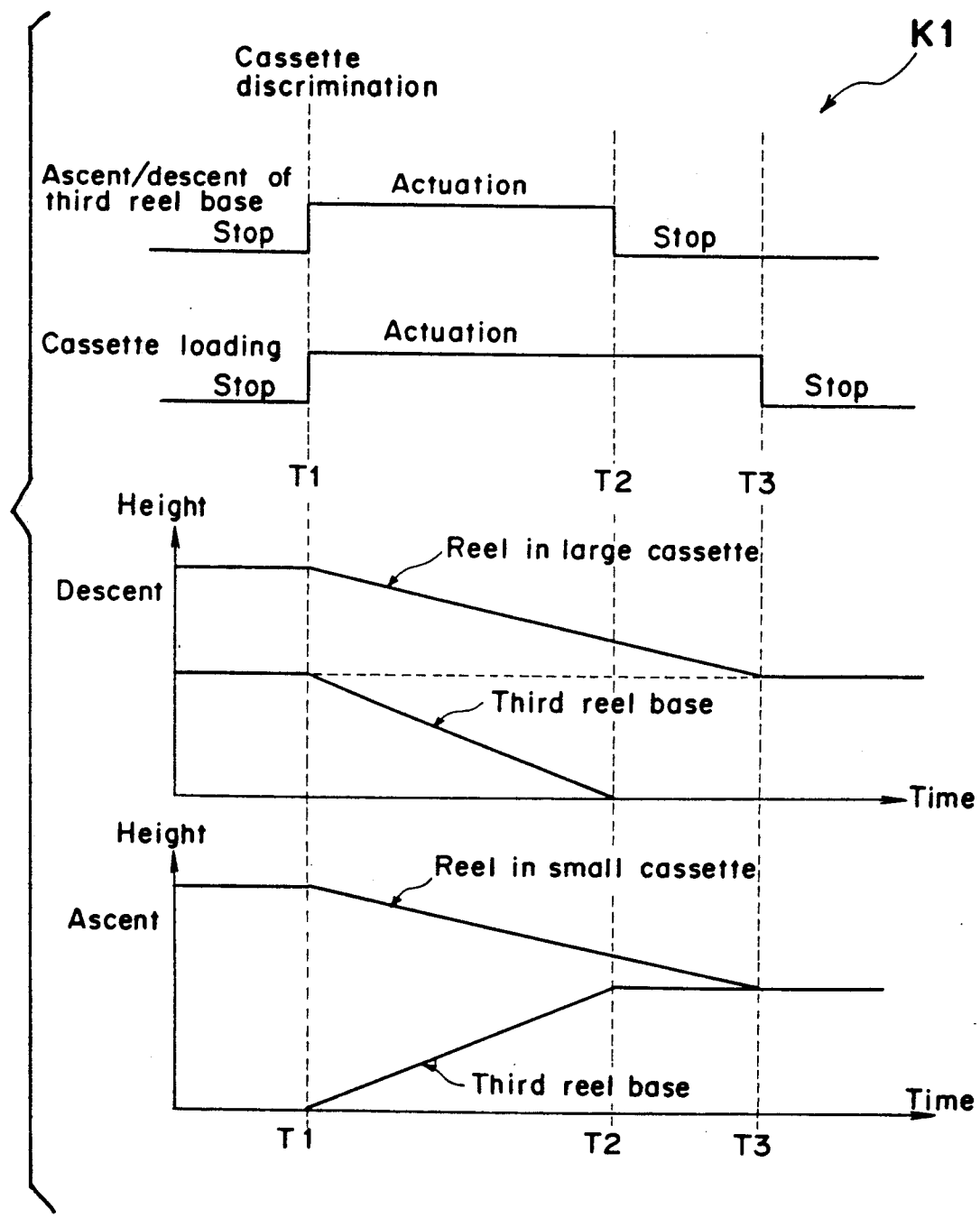
FIGS. 18 and 19 are timing charts of the apparatus of FIG. 6 and the modified apparatus of FIG. 17, respectively.

FIG. 16 shows another arrangement in which a rotational force is transmitted to the third reel base 30. In FIG. 16, a motor 110 is secured to the bottom plate 31 by a screw 111 and the third reel base 30 is mounted on an output shaft of the motor 110 such that the third reel base 30 is rotated by the motor 110.

Operation of the magnetic recording and reproducing apparatus K1 of the above described arrangement is described, hereinbelow. Initially, loading of a large cassette 48 is described. When the large cassette 48 is inserted into a cassette holder 22, the microswitches 26a and 26b are turned on and thus, the system control circuit decides at a time point T1 of FIG. 18 that the large cassette 48 has been inserted into the cassette holder 22. In FIG. 10, the motor 40 is rotated clockwise for a predetermined time period. Upon clockwise rotation of the motor 40, the slide lever 34 is displaced leftwards, i.e. in the direction of the arrow P through rotation of the gears 42 and 43. At this time, the large cassette 48 also starts descend towards a cassette loading position at which the large cassette 48 or the small cassette 25 is to be held. When leftward displacement of the slide lever 34 is started, the cam portion 34e, of the slide lever 34 depresses the boss 37a of the pivotable lever 37 so as to pivot the lever 37 counterclockwise. Thus, the intermediate gear 36 in mesh with the gear 29a of the second reel base 29 and the gear 30a of the third reel base 30 is displaced so as to be disengaged from the gears 29a and 30a.

When the slide lever 34 is further displaced leftwards, the end cam 34a supporting the projection 31a of the bottom plate 31 engages an oblique part. Since the bottom plate 31 is urged downwardly by the return spring 35, the bottom plate 31 is lowered along oblique part of the end cam 34a. As a result, at a point T2 in FIG. 18, the third reel base 30 is also lowered to a location where the third reel base 30 does not interfere with the large cassette 48. At the time point T2, descent of the large cassette 48 is not completed. At a time point T3 upon further passage of time, the large cassette 48 reaches the cassette loading position and thus, loading of the large cassette 48 is completed.

Next, loading of a small cassette 25 will be described. When a small cassette 25 is inserted into the cassette holder 22, only the microswitch 26a is turned on and thus, the system control circuit decides at the time point T1 that the small cassette 25 has been inserted into the cassette holder 22. In FIG. 11, the motor 40 is rotated counterclockwise for a predetermined time period. Upon counterclockwise rotation of the motor 40, the slide lever 34 is displaced rightwards, i.e. in the direction of the arrow Q through rotation of the gears 42 and 43. At this time, the small cassette 25 also starts descend towards the cassette loading position. When the slide lever 34 is displaced rightwards, the end cam 24a lifts the bottom plate 31 and the third reel base 30 to the lifted position. After the third reel base 30 has been held at the lifted position, the boss 37a of the pivotable lever 37 is spaced away from the cam portion 34e of the slide lever 34 and the lever 37 is pivoted clockwise by the spring 46 and stopped by the stop pin 47. The stop pin 47 is preliminarily so adjusted in position as to stop the lever 37 at a location where the intermediate gear 36 is engaged with the gear 29a of the second reel base 29 and the gear 30a of the third reel base 30. In this state, the third reel base 30 is held at the lifted position at the time point T2 in FIG. 18. At this time, descent of the small cassette 25 is not completed.

At the time point T3 upon further passage of time, the small cassette 25 reaches the cassette loading position and thus, loading of the small cassette 25 is completed. When the third reel base 30 is held at the lifted position, the third reel base 30 is engaged with the second reel base 29 through the intermediate gear 36 and thus, a rotational force is transmitted to the third reel base 30 upon rotation of the second reel base 29. Stopping of rotation of the motor 40 is controlled more accurately by using a position detecting sensor associated operatively with the slide lever 34. Furthermore, it is possible to transmit a rotational force to the third reel base 30 by employing a rubber idler roller in place of the gear.

As described above, a large cassette 48 is driven by the first and second reel bases 28 and 29. A small cassette 25 is mounted on the first and third reel bases 28 and 30 and the third reel base 30 is driven by the second reel base 29 through the intermediate gear 36.

Figure 17:
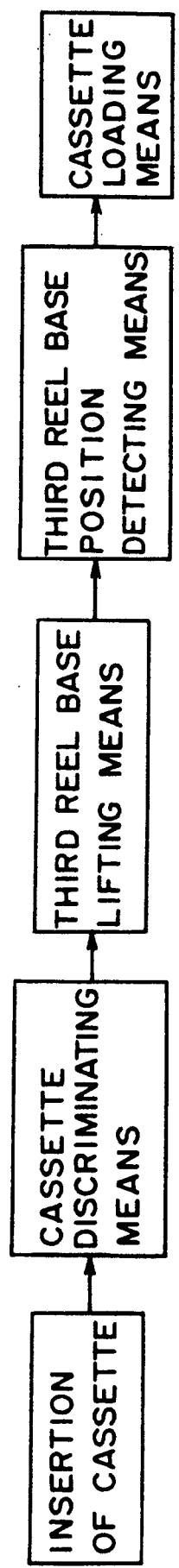
FIG. 17 is a diagram similar to FIG. 6, particularly showing a modification thereof.
Figure 19:
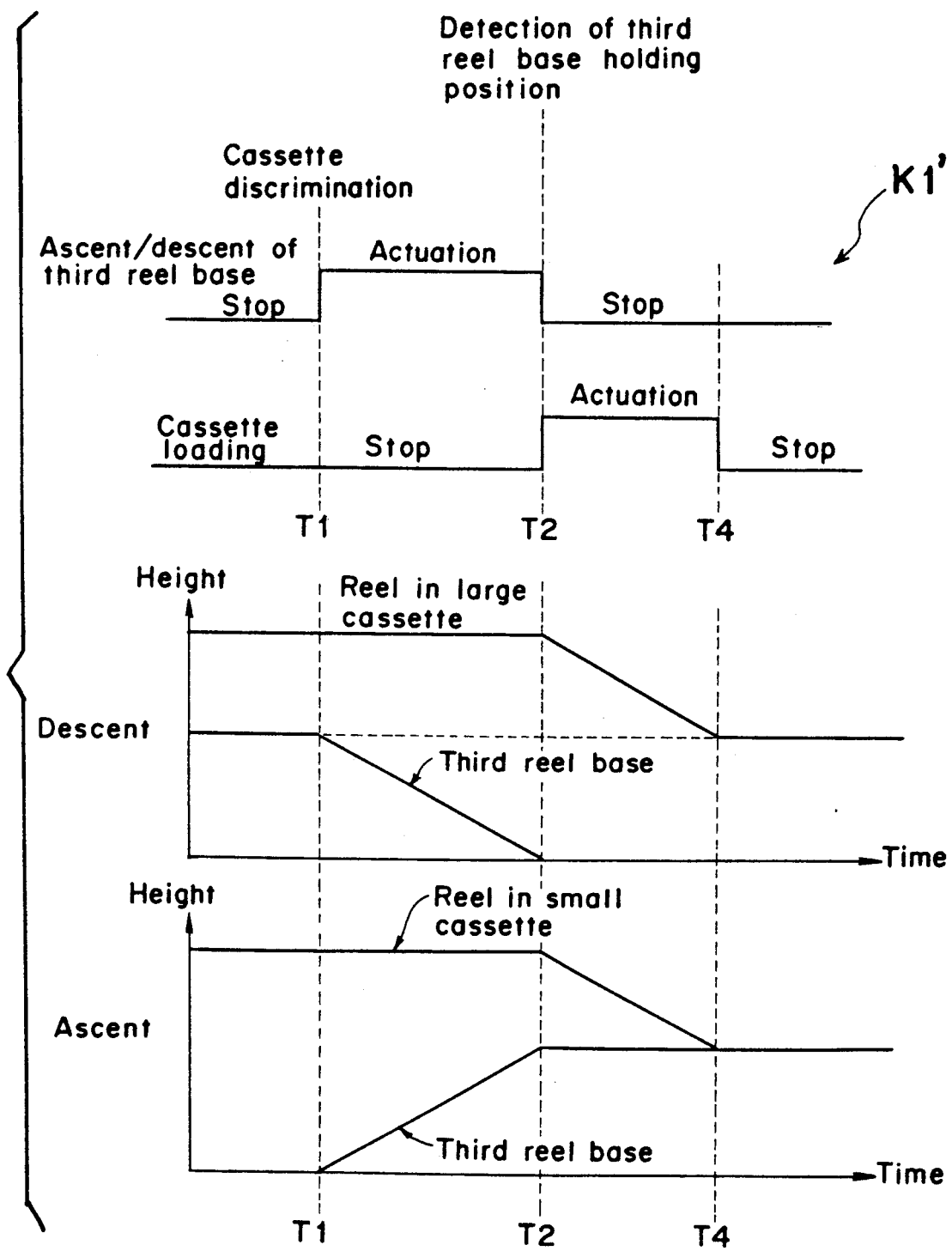

In the above described embodiment, it is so arranged that after discrimination between the kinds of cassette, the time period during which movement of the third reel base to the lifted position or the lowered position has been completed shorter than the time period during which loading of the cassette is completed. However, the apparatus K1 can also be, needless to say, so arranged as shown in a modified apparatus K1' of FIGS. 17 and 19 that loading of the cassette is started after detection of completion of descent or ascent of the third reel base. In this modified apparatus K1', the operation is performed more positively than the apparatus K1.

As is clear from the foregoing description, in accordance with the present invention, prior to completion of loading of a cassette, displacement of the third reel base is completed. Thus, during loading of a large cassette, the phenomenon that collision between the large cassette and the third reel base takes place where descent of the third reel base is not completed when the large cassette is being lowered can be prevented. On the other hand, during loading of a small cassette, the drawback that collision between the take-up reel of the small cassette and the third reel base occurs where ascent of the third reel base is not completed when the small cassette being lowered can be prevented. Therefore, the third reel base can be lifted smoothly.

Figure 20:
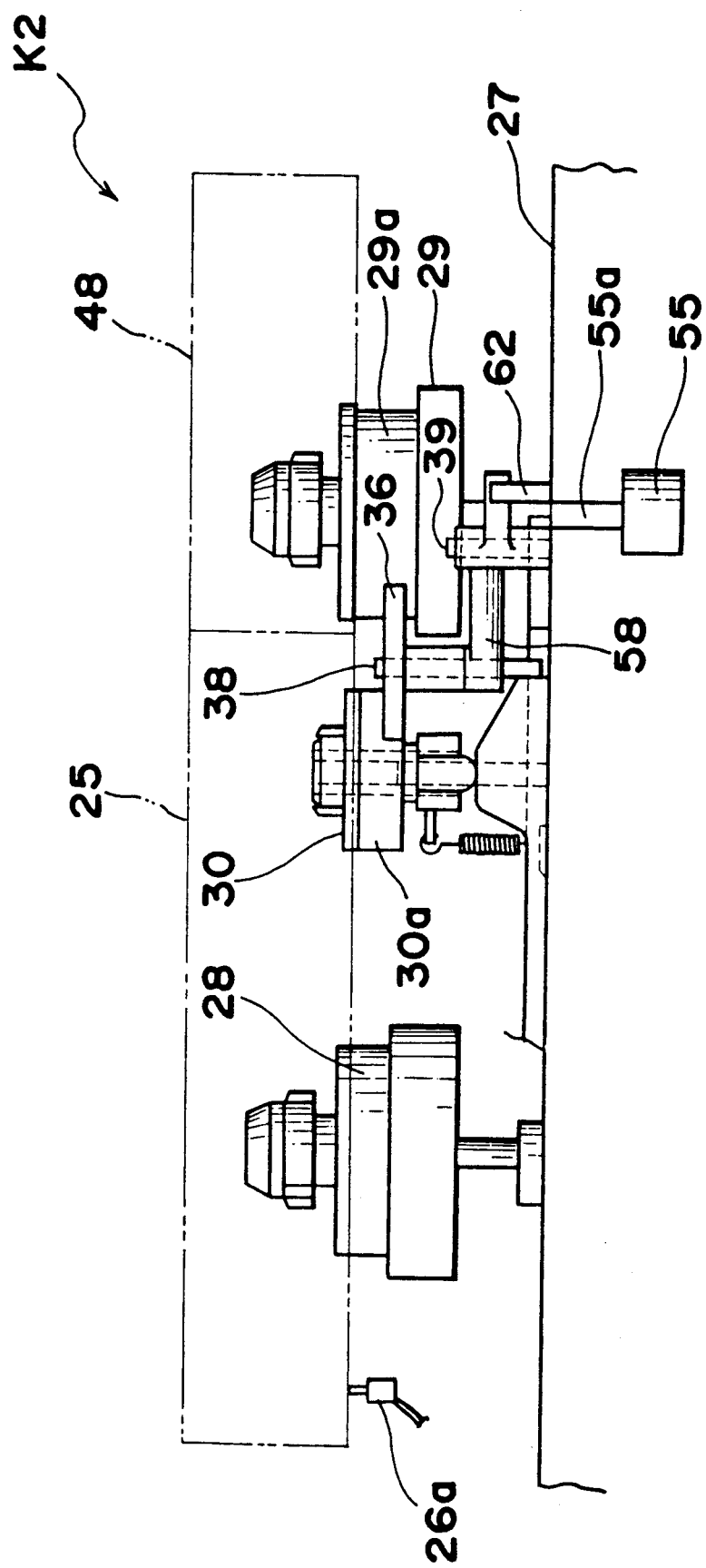
FIGS. 20 and 21 are views similar to FIGS. 9 and 10, respectively, particularly showing a second embodiment of the present invention.
Figure 21:
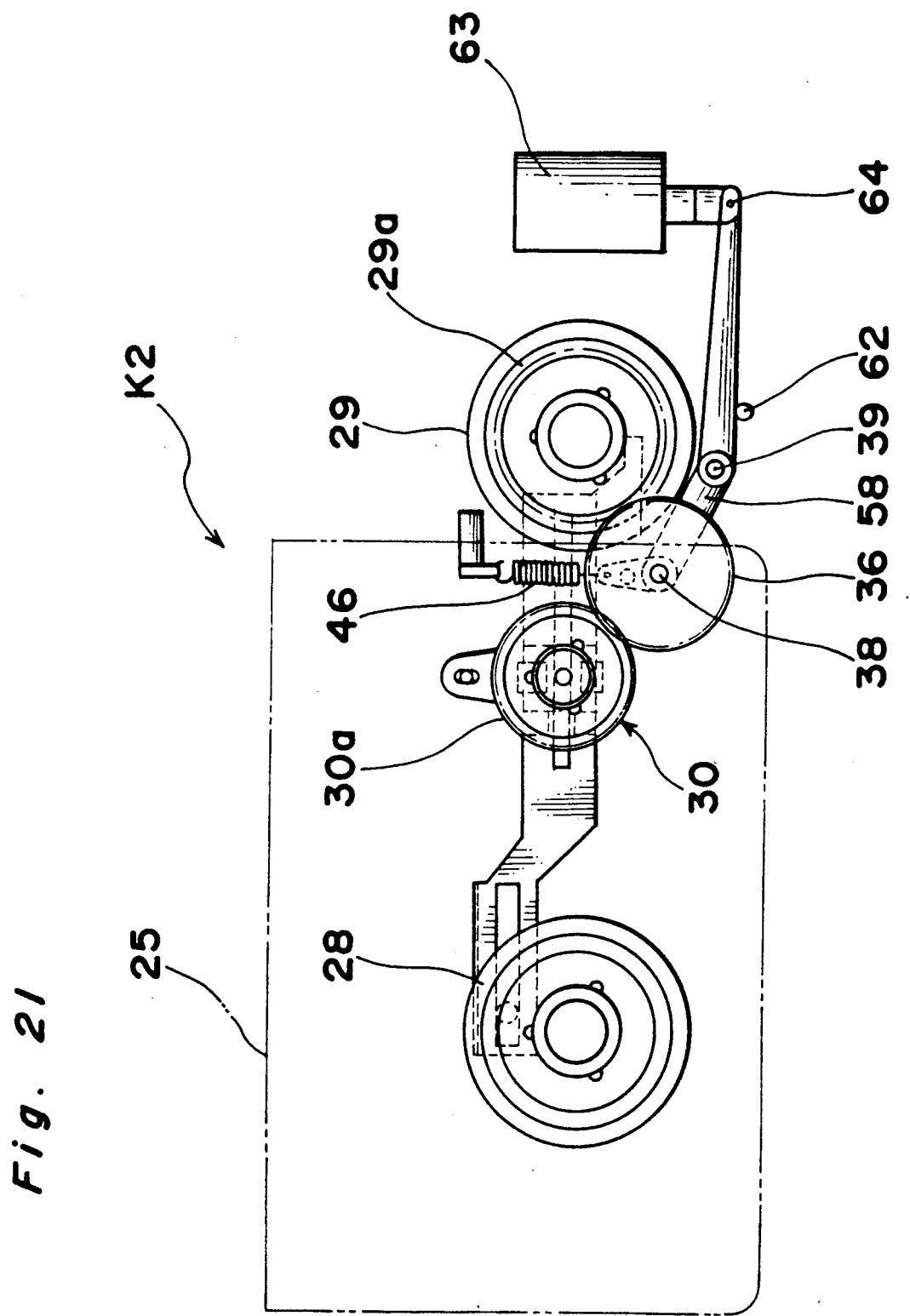

Referring further to FIGS. 20 and 21, there is shown a magnetic recording and reproducing apparatus K2 according to a second embodiment of the present invention. The apparatus K2 includes a rotary drive unit for driving the third reel base 30. In the rotary drive unit, the gear 29a of the second reel base 29 is coupled with an output shaft 55a of a motor 55. The gear 36 is disposed at such a location as to be engaged with the gear 29a and the gear 30a of the third reel base 30. A pivotable lever 58 is pivotably mounted so as to be pivoted about the shaft 39. A stop pin 62 is provided for stopping the lever 58 at a location where the intermediary gear 36 is engaged with the gear 29a and the gear 30a. A solenoid 63 is coupled with the lever 58 by a pin 64. Since other constructions of the apparatus K2 are similar to those of the apparatus K1, a description thereof is omitted for the sake of brevity.

Hereinbelow, operation of the rotary drive unit of the above described arrangement is described. When a small cassette 25 is inserted into the cassette holder 22, the microswitch 26a is turned on. Then, when the gear 29a is driven for rotation by the motor 55, the third reel base 30 is driven through the intermediate gear 36. When the solenoid 63 is energized, the lever 58 is pivoted counterclockwise about the shaft 39 and thus, the intermediary gear 36 is disengaged from the gear 29a and the gear 30a of the third reel base 30. Subsequently, when energization of the solenoid 63 is stopped, the lever 58 is pivoted clockwise about the shaft 39 by the spring 46 until it is stopped by the stop pin 62. Even if the intermediate gear 36 is not properly engaged with the gears 29a and 30a due to contact among the tooth edges, this improper engagement can be eliminated as follows. For example, in an arrangement in which the intermediate gear 36 is brought into contact with the gear 30a of the third reel base 30 earlier than the gear 29a in the case where the intermediate gear 36 is displaced to the predetermined position immediately after insertion of a small cassette 25 into the cassette holder 22 has been detected by the microswitch 26a, the first reel base 28 is rotated in the rewinding direction a necessary amount so as to rewind the tape of a necessary length, so that not only is the gear 30a of the third reel base 30 rotated so as to be surely engaged with the intermediate gear 36 but also the intermediate gear 36 and the gear 29a are surely engaged with each other by rotation of the intermediate gear 16. In an arrangement in which the intermediate gear 36 is brought into contact with the gear 29a earlier than the gear 30a of the third reel base 30 in the case where the intermediate gear 36 is displaced to the predetermined position, not only is the gear 29a is surely engaged with the intermediate gear 36 by rotating the gear 29a a necessary amount but the intermediate gear 36 and the gear 30a of the third reel base 30 can be surely engaged with each other by rotation of the intermediate gear 36.

Figure 22:
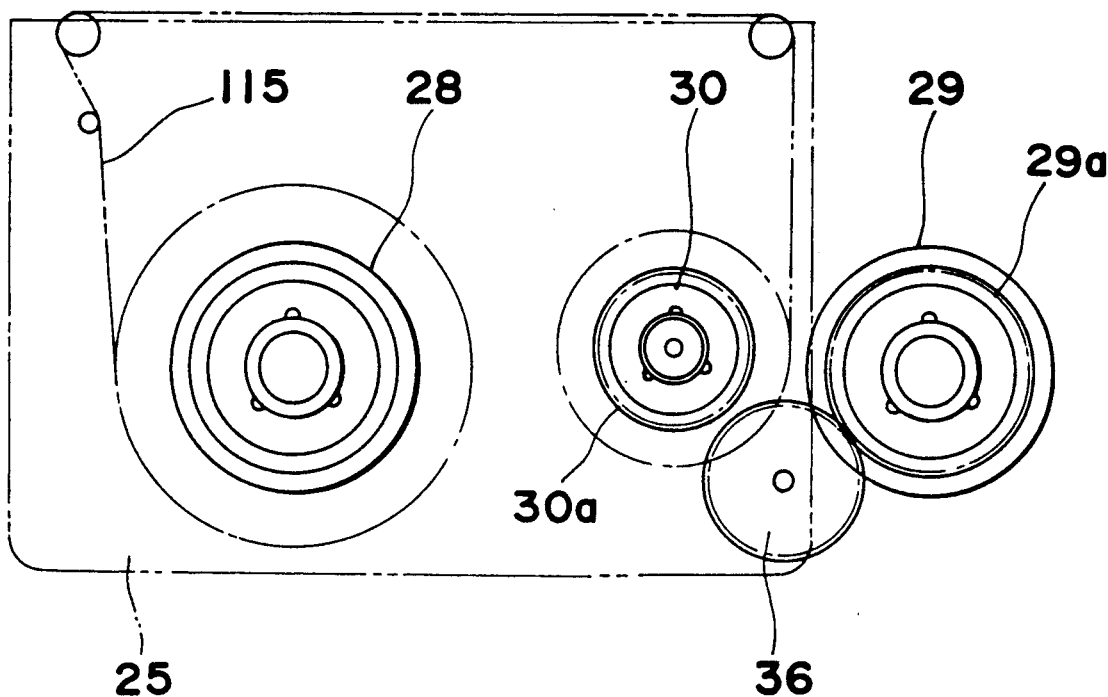
FIG. 22 is a view showing one arrangement employed in the apparatus of FIG. 20.

More concretely, FIG. 22 shows a state in which tooth edges of the intermediate gear 36 are engaged with those of the gear 29a in the arrangement in which the intermediate gear 36 is brought into engagement with the gear 29a earlier than the gear 30a of the third reel base 30. In FIG. 22, reference numeral 115 denotes a magnetic tape of the small cassette 25. In this state, by rotating the gear 29a, the intermediate gear 36 is engaged with the gear 29a and is displaced so as to be engaged with the gear 30a of the third reel base 30.

Figure 23:
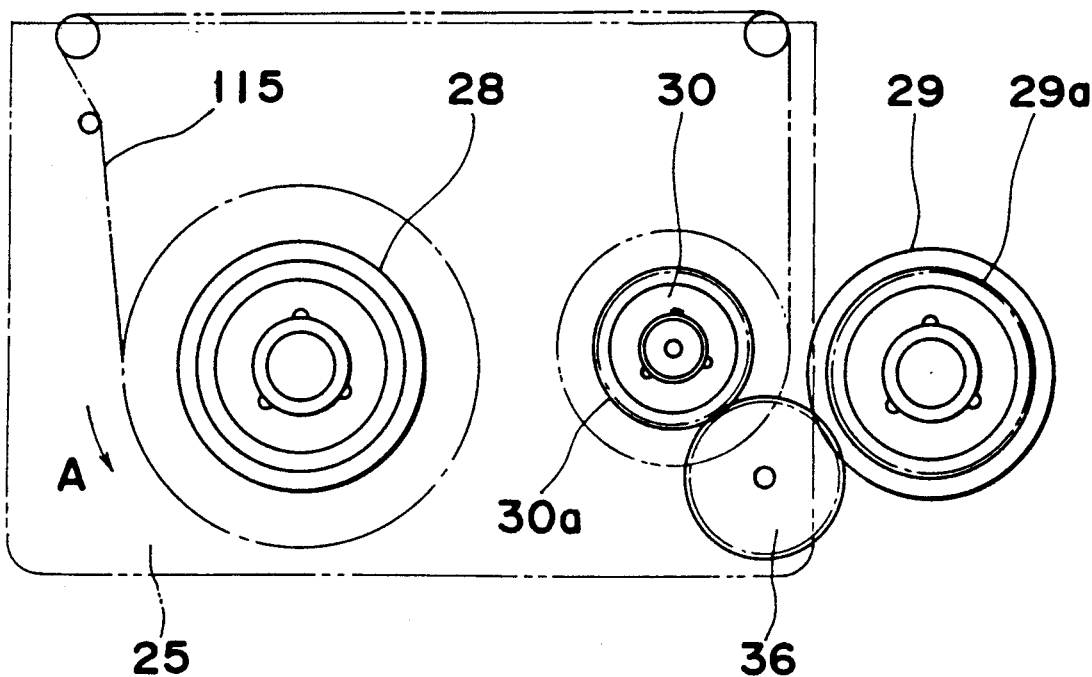
FIGS. 23 and 24 are views showing another arrangement employed in the apparatus of FIG. 20.
Figure 24:
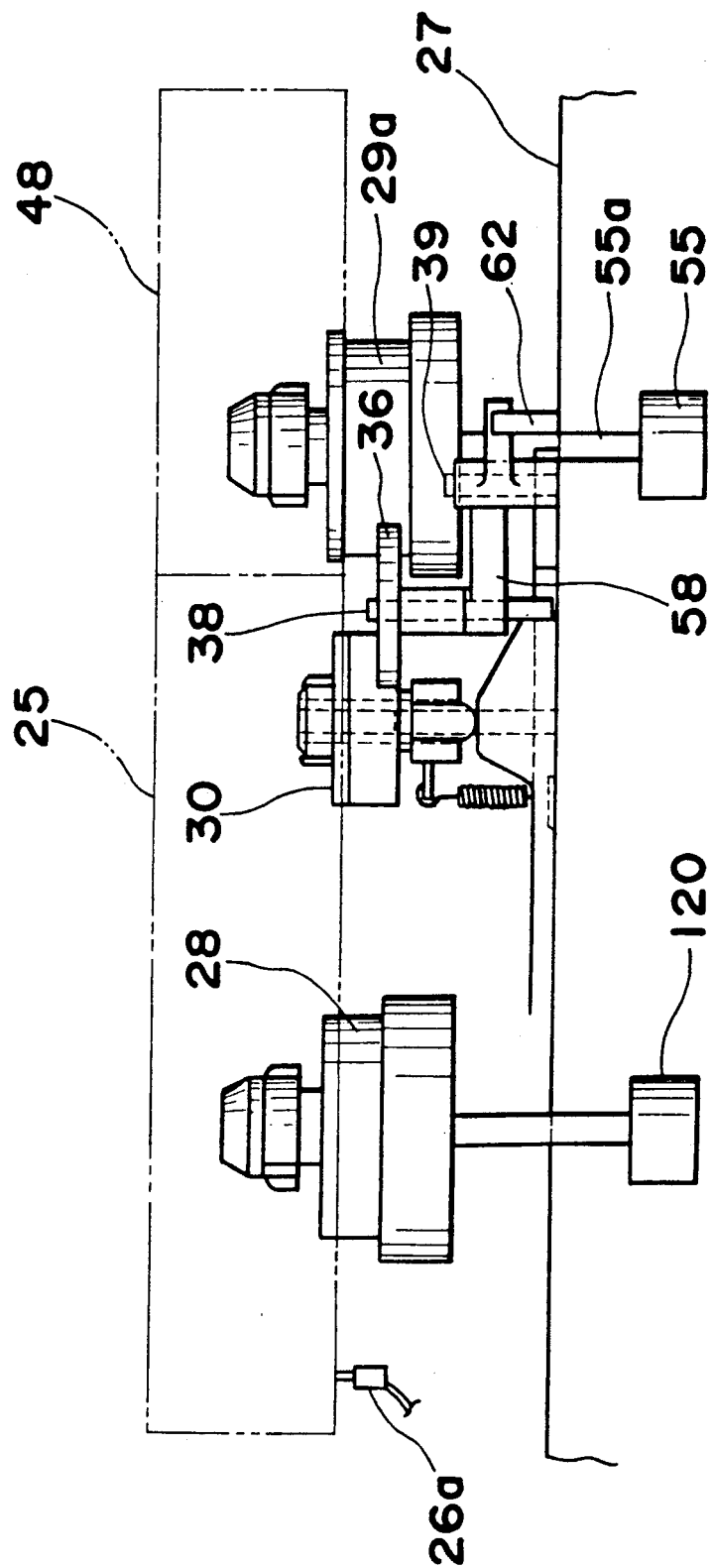

FIGS. 23 and 24 show a state in which tooth edges of the intermediate gear 36 are engaged with those of the gear 30a of the third reel base 30 in the arrangement in which the intermediate gear 36 is brought into engagement with the gear 30a earlier than the gear 29a. As shown in FIG. 24, a motor 120 is additionally provided so as to be coupled with the supply reel base 28. In FIG. 23, by rotating the supply reel base 28 in the direction of the arrow A by the motor 120, the third reel base 30 is rotated by the supply reel base 30 through the magnetic tape 115. Thus, when the supply reel base 28 is rotated a necessary amount in the direction of the arrow A after loading of a small cassette 25, the gear 30a of the third reel base 30 is rotated so as to be engaged with the intermediate gear 36. Upon engagement of the gear 30a with the intermediate gear 36, the intermediate gear 36 is displaced so as to be engaged with the gear 29a.

In order to obtain secure engagement of the gears, it can also be so arranged that amount of rotation of the first reel base 28 or the second reel base 29 is controlled by detecting variations of torque of the motor 55 between the state of contact of the tooth edges and the state of full engagement of the gears. Alternatively, it can also be so arranged that a sensor for detecting position of the intermediary gear 36 is provided so that rotation of the first reel base 28 or the second reel base 29 is stopped at the time when the sensor detects that the intermediate gear 36 has been displaced to the predetermined position.

As will be seen from the description given so far, the rotary drive unit of the apparatus K2 according to the second embodiment of the present invention comprises: the gear 29a coupled with the motor 55; the third reel base 30 having formed, on its outer periphery, the gear 30a; the intermediate gear 36 disposed between the gear 29a and the third reel base 30 so as to be engageable with the gear 29a and the gear 30a of the third reel base 30; and means (spring 46) for urging the intermediate gear 36 to the location where the intermediate gear 36 is engageable with the gears 29a and 30a. In the arrangement in which the intermediate gear 36 is brought into contact with the gear 30a of the third reel base 30 earlier than the gear 29a in the case where the intermediate gear 36 is displaced to the predetermined position, the first reel base 28 is rewound the necessary amount so as to rewind the tape by a necessary length, so that not only is the third reel base 30 surely engaged with the intermediate gear 36 by rotation of the third reel base 30 but also the intermediate gear 36 and the gear 29a are surely engaged with each other by rotation of the intermediate gear 36.

On the other hand, in the arrangement in which the intermediate gear 36 is brought into contact with the gear 29a earlier than the gear 30a of the third reel base 30 in the case where the intermediate gear 36 is displaced to the predetermined position, not only is the gear 29a surely engaged with the intermediate gear 36 by rotating the gear 29a a necessary amount but also the intermediate gear 36 and the gear 30a of the third reel base 30 can be surely engaged with each other by rotation of the intermediate gear 36.

Therefore, in the second embodiment of the present invention, since the gears can be surely engaged with each other in both the arrangements referred to above, it becomes possible to positively drive the third reel base 30 for its rotation.

In the second embodiment of the present invention, rotation of the gear 30a is transmitted to the third reel base 30 through the intermediary gear 36. However, it can also be so arranged that the gear 30a of the third reel base 30 is used as a driving source such that rotation of the third reel base 30 is transmitted to the second reel base 29 through the intermediate gear 36. The rotary drive unit of the present invention can be applied to a video tape recorder, an audio tape recorder, etc.

As is clear from the foregoing, in accordance with the second embodiment of the present invention, since either one of the gear of the reel base or the drive gear is driven after the drive gear has been displaced to the predetermined position, the drive gear, the intermediate gear and the gear of the reel base are fully engaged with each other at all times and thus, the reel base can be driven positively. Therefore, since the problem associated with the prior art frictional power transmission mechanism can be eliminated that a large radial force is applied to the shafts of the gears, operational reliability of the rotary drive unit is improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A magnetic recording and reproducing apparatus comprising:
    a cassette discriminating means for discriminating between a large cassette incorporating a first supply reel and a first take-up reel spaced a first distance from each other and small cassette incorporating a second supply reel and a second take-up reel spaced a second distance from each other and the second distance being smaller than the first distance, and the small cassette having an external size smaller than that of said large cassette;
    a first reel base which is engageable with said first supply reel of said large cassette or said second supply reel of said small cassette;
    a second reel base which is engageable with said first take-up reel of the large cassette;
    a third reel base disposed between said first reel base and said second reel base so as to be engaged with said second take-up reel of said small cassette and having means for lifting and lowering said third reel base between a lifted position and a lowered position vertically relative to an apparatus housing of said magnetic recording and reproducing apparatus;
    a first cassette loading means for loading said large cassette onto said first reel base and said second reel base such that said third reel base is moved to the lowered position before completion of loading of said large cassette;
    a second cassette loading means for loading said small cassette onto said first reel base and said third reel base such that said third reel base is moved to the lifted position before completion of loading of said small cassette; and
    a rotational power transmission for transmitting a rotational force to said third reel base when said third reel base is held at the lifted position.

2. A magnetic recording and reproducing apparatus as claimed in claim 1, further comprising a motor connected to said third reel base for lifting and lowering said third reel base.

3. A magnetic recording and reproducing apparatus as claimed in claim 1, further comprising an electromagnetic solenoid connected to said third reel base for lifting and lowering said third reel base.

4. A magnetic recording and reproducing apparatus as claimed in claim 1, further comprising a cam engaged with said third reel base for lifting and lowering said third reel base.

5. A magnetic recording and reproducing apparatus as claimed in claim 1, further comprising a link engageable with said third reel base and means for rotating said link for lifting and lowering said third reel base through rotation of said link.

6. A magnetic recording and reproducing apparatus as claimed in claim 1, further comprising a spring disposed below said third reel base for lifting said third reel base,
    said spring urging said third reel base upwardly at all times;
    said third reel base, at the time of loading of a large cassette, being depressed downwardly by a lower face of said large cassette so as to be lowered.

7. A magnetic recording and reproducing apparatus as claimed in claim 1, further comprising a gear formed around said third reel base and with which said first-mentioned gear is engaged, when said third reel base is held at the lifted position, being engageable with a mating gear of said second take-up reel of said small cassette so as to drive said second take-up reel of said small cassette.

8. A magnetic recording and reproducing apparatus as claimed in claim 1, wherein said rotational power transmission means includes a motor, and said third reel base has a rotational shaft to which said motor is connected.

9. A magnetic recording and reproducing apparatus as claimed in claim 1, wherein said rotational power transmission means includes a gear formed around said second reel base and a further gear formed around said third reel base, said further gear being engageable with said first-mentioned gear, said further gear having an axial length larger than a vertical stroke of said third reel base so as to be engaged with said first-mentioned gear at all times regardless of whether said third reel base is disposed at the lifted position or the lowered position, whereby the rotational force is transmitted to the third reel base by rotating said first-mentioned gear.

* * * * *

UNITED STATES PATENT AND TRADEMARK OFFICE
CERTIFICATE OF CORRECTION

PATENT NO. : 5,034,831

DATED : July 23, 1991

INVENTOR(S) : Chikanori MIYAWAKI et al.

It is certified that error appears in the above-identified patent and that said Letters Patent is hereby corrected as shown below:

ON TITLE PAGE:

In the heading, line [73], for "Samsung Electronics Co., Ltd., Seoul, Rep. of Korea", read --Matsushita Electric Industrial Co., Ltd., Osaka, Japan--.

For the line "Attorney, Agent, or Firm", for "Cushman, Darby & Cushman" read --Wenderoth, Lind & Ponack--.

Signed and Sealed this

Twenty-eighth Day of April, 1992

Attest:

HARRY F. MANBECK, JR.

*Attesting Officer*     *Commissioner of Patents and Trademarks*